Figure 1:
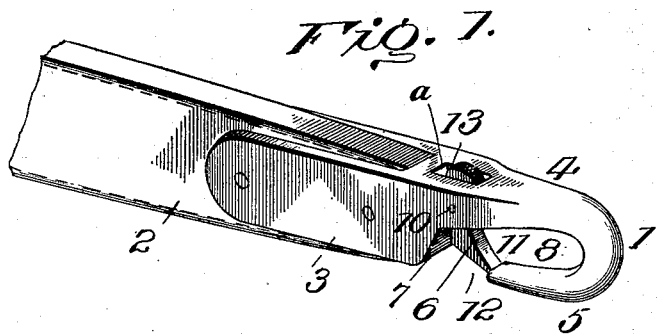

No. 648,429. Patented May 1, 1900.
P. PETERSON.
TUG HOOK.
(Application filed Mar. 11, 1899.)

(No Model.)

Witnesses
Inventor
Peter Peterson
by R. S. & A. B. Lacey his Attorneys

UNITED STATES PATENT OFFICE.

PETER PETERSON, OF REELS, IOWA.

TUG-HOOK.

SPECIFICATION forming part of Letters Patent No. 648,429, dated May 1, 1900.

Application filed March 11, 1899. Serial No. 708,705. (No model.)

*To all whom it may concern:*

Be it known that I, PETER PETERSON, a citizen of the United States, residing at Reels, in the county of Pottawattamie and State of Iowa, have invented certain new and useful Improvements in Harness Attachments; and I do hereby declare the following to be a full, clear, and exact description of the invention, such as will enable others skilled in the art to which it appertains to make and use the same.

The object of the present invention is the provision of a hook or attachment for harness which will admit of a strap being easily and quickly applied thereto and which will prevent the accidental disengagement of the strap when coupled.

The device is of such construction as to admit of its use in connection with traces or tugs, whiffletrees, thills, and the like.

The improvement is described more particularly hereinafter, claimed, and shown in the drawings hereto attached, in which—

Figure 2:
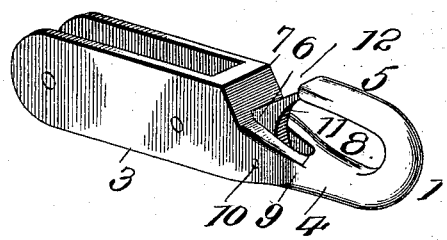
Figure 3:
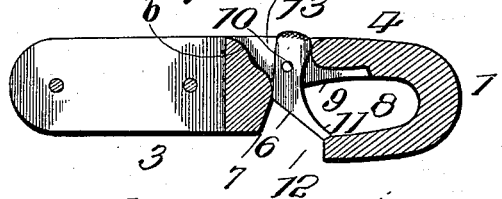
Figure 4:
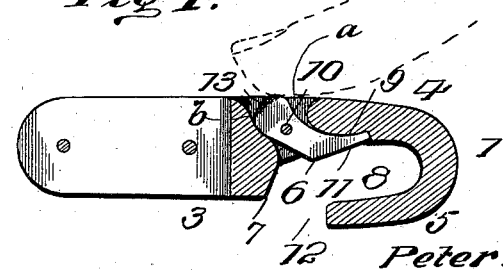

Figure 1 is a perspective view of the device, showing it applied to a tug or trace. Fig. 2 is a perspective view of the device, *per se*, inverted. Fig. 3 is a longitudinal section, the latch being projected across the throat of the hook. Fig. 4 is a view similar to Fig. 3, the latch being turned aside by the finger, so as to admit of the detachment of the device from the whiffletree-hook or the uncoupling of a strap therefrom if applied to the whiffletree or thills.

Referring to the drawings, in which like parts are indicated by the same reference-numerals, the hook 1 is shown as applied to a tug or trace 2 and as composed of a clip 3, shank 4, bill 5, and pivoted latch 6. A shoulder 7 is formed at the base of the shank 4, and the bill 5 terminates a short distance from the shoulder, so as to form a space 8, through which the part to be coupled has free ingress and egress. The shank widens toward the clip, and its sides come flush with the sides of the clip, thereby preventing the formation of projecting corners or parts which would be liable to chafe the horse or the harness. A depression 9 is formed in the shank 4 and leads into the transverse opening $a$ in line with the shoulder 7 and extends lengthwise of the said shank and decreases in depth as it approaches the hook. This depression is deepest at the end subjacent to the transverse opening $a$, which latter extends through the outer side of the shank for a purpose presently to be explained. The formation of the depression does not weaken the shank, because the increased width thereof more than compensates for the material removed to form the recess. The decreasing width of the shank as it approaches the closed end of the hook is proportionate to the gradual diminution in depth of the recess 9.

The latch 6 is of substantially elbow form, and its butt is made rounding and pivotally connected to the shank of the hook by means of the pin 10. This latch is adapted to fold into the depression 9, so as to offer no obstacle to the free passage of the part to be applied to the hook into or from the throat thereof. The bent end 11 of the latch extends at such an angle as to project across the space 8 and prevent the accidental withdrawal of the part or link after it has been engaged with the hook. This bent end is adapted to enter the shallow part of the depression 9 and is made tapering to lie snugly therein and forms with the shoulder 7 a mouth or flaring space 12, which admits of the easy and ready application of the device to the part to be attached thereto. The outer terminals of the end walls of the opening $a$ flare, and the wall $b$ at the base of the shank, about in transverse alinement with the shoulder 7, inclines in an opposite direction thereto to provide for the movement of the latch when open, as shown in Fig. 4. In either extreme position of the latch it obtains bearings at two diagonally-disposed points of contact, said points of contact being positioned upon opposite sides of the pivot-fastening 10. This is plainly shown in Figs. 3 and 4. When open, the latch has its butt or heel portion resting against the wall $b$ and its toe entering the depression 9.

It is to be understood that the latch operates by gravity and always occupies a pendent position and normally extends across the throat 8. The butt or rounding end 13 of the latch projects a slight distance beyond the plane of the outer side of the shank to be engaged by the thumb or finger of the hand when it is required to fold the latch to admit of the uncoupling of the device. The finger when engaged with the butt of the latch is moved and effects a turning of the latch, as clearly indicated by Fig. 4.

Having thus described the invention, what is claimed as new is—

As a new and improved article of manufacture, a tug-hook comprising spaced plates joined at one end by a cross-bar, which cross-bar has its outer face reversely and rearwardly inclined from a central point to form upper, lower and intermediate shoulders, a hook comprising a shank extending forwardly from the upper portion of the cross-bar and widest at its rear end, and a bill at the forward end of the shank, said shank being formed in its widened rear end with a transverse opening extending diagonally therethrough in the direction of inclination of the upper inclined shoulder of the cross-bar, whereby its upper and outer end opens through the shank at a point in the rear of its lower and inner end, a shoulder being formed at the front of said opening and facing said upper inclined shoulder and a longitudinal recess provided in the under side of the shank and communicating with the said lower and inner end of the transverse opening, and a substantially elbow-shaped gravity-latch having its straight arm or body portion pivotally mounted upon a pin extending transversely across the opening and its angular arm or tongue arranged obliquely thereto, the construction being such that when the latch is open the straight arm thereof obtains bearing against the upper inclined shoulder and the inclined arm against the upper wall of the recess, and when closed the said straight arm bears against the said intermediate shoulder of the cross-bar and front-shoulder wall of the opening and the toe of the oblique arm against the extremity of the bill, substantially as described.

In testimony whereof I affix my signature in presence of two witnesses.

PETER PETERSON. [L. S.]

Witnesses:
JOHN I. LUTZ,
P. J. McBRIDE.